May 29, 1934.  A. McMULLEN  1,961,075
TRAP
Filed Jan. 20, 1933
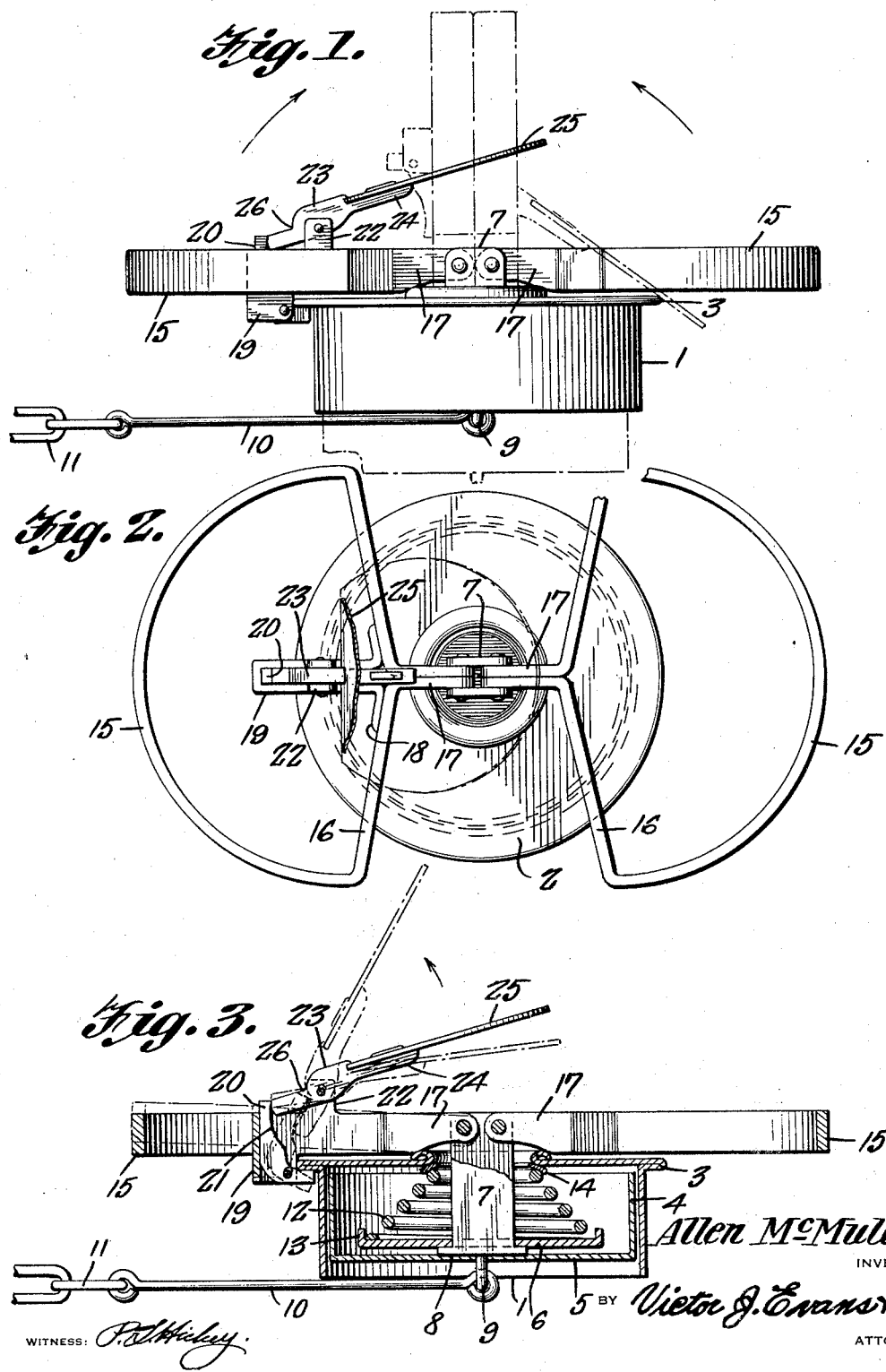

Patented May 29, 1934

1,961,075

UNITED STATES PATENT OFFICE 1,961,075

TRAP

Allen McMullen, Number Four, N. Y.

Application January 20, 1933, Serial No. 652,719

5 Claims. (Cl. 43—88)

This invention relates to animal traps, and its general object is to provide a trap of the clamping jaw anchored type that includes parts swivelly associated to allow free rotation thereof, to prevent the trap chain or other connecting means from being wound about its anchoring means, the trap or obstructions by the caught animal, and holding the trap fixed, as when a trap of the type referred to becomes fixed it is an easy matter for the animal to break its caught leg which not only makes escape easy, but is detrimental from a humane standpoint and renders the animal useless, as well as has a tendency to damage the pelt.

Another object of the invention is to provide an animal trap that can be set to catch animals of a size desired, in that the trigger can be adjustably associated with its dog to vary the amount of contact from a full set position to what is termed a hair trigger position, and when in a full set position, only heavy animals are capable of springing the trap, and birds and small animals will have no effect thereon.

A further object of the invention is to provide an animal trap that can be set in a safety position or in a position which cannot be sprung, and such a feature is extremely advantageous in that a number of traps can be set accordingly prior to taking them to the hunting grounds, where slight adjustment is all that is necessary to set them in the catching positions.

A still further object of the invention is to provide an animal trap that includes a housing for the spring and jaw operating parts, in order to protect the same.

Another object of the invention is to provide a trap of the type set forth, that is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation of a trap constructed in accordance with the present invention and showing the same in set position.

Figure 2 is a top plan view thereof.

Figure 3 is a vertical sectional view taken through the trap and showing the various positions in which it can be set.

Referring to the drawing in detail, the reference numeral 1 indicates the outer section or shell of the body of the trap, which is in the form of a housing and the section 1 is provided with an open bottom, while the top 2 is formed thereon in a manner to provide an annular outwardly extending flange 3 about the upper edge of the vertical wall thereof for a purpose which will be later described. The housing likewise includes an inner section or shell 4 which is of a size to be slidably mounted within the outer section 1 and is telescopically received therein as shown in Figure 3. The inner section has an open upper end, but is provided with a bottom 5. While I have shown the housing sections as being circular in formation, I want it understood that they can be of any shape capable of performing the desired function without departing from the spirit of the invention.

Arranged within the inner section 4 is a disk 6 which is provided with a centrally disposed square cornered opening through which is passed the upstanding spaced parallel arms 7 of a substantially U-shaped member, the bight portion or base 8 of which is of a size to extend upon opposite sides of the opening as shown in Figure 3, and swivelly secured to the base 8 and mounted for rotation through the bottom 5 of the inner section 4 is the shank of an eye 9, which receives one eyed end of a resilient link 10, while its opposite eyed end is secured to the anchoring chain 11 for the trap.

The top 2 has an opening centrally arranged therein, through which passes the arms 7, and surrounding the arms 7 is a coil spring 12 which has its convolutions decreasing in size from its bottom to its top and the lower convolution is disposed in contacting engagement with the disk 6 and held associated, through the instrumentality of lugs 13 which are formed with the periphery of the disk. The upper or small convolution of the coil spring 12 bears against a washer 14 which is engageable with the under surface of the top 2 about the opening as clearly shown in Figure 3. By this construction, it will be apparent that the U-shaped member which in fact is the post for the trap is formed in one piece and the coil spring urges the post or U-shaped member downwardly, as will be noted upon inspection of Figure 3.

The jaws of the trap are each formed from a single piece of material and include cooperating substantially semi-circular jaw portions 15 from the ends of which extend converging limbs 16 that have their ends bent at an angle and the bent ends are disposed in contacting engagement to provide shanks 17. These shanks 17 are preferably reduced and are pivotally secured between the arms 7 as best shown in Figure 2, so that when the spring 12 urges the post or U-shaped member downwardly, the jaws will be snapped in clamped association, after being tripped in a manner which will be presently described.

Secured to the limbs 16 of one of the jaws, at the juncture of the shank 17 therewith are the outwardly bent ends 18 of a substantially U-shaped bracket 19 that is widened at its free end and pivotally secured to the widened portion adjacent its lower end for disposal between the arms of the U-shaped bracket 19 is a dog 20. It will be noted that the dog is pivoted adjacent one end and this end is adapted to engage the underside of the flange 3 to hold the trap in set position as best shown in Figure 3. The outer surface of the dog is engageable with the bight portion of the U-shaped bracket 19, and the inner surface thereof is concaved to provide a cam surface 21.

Rising from the arms of the U-shaped bracket 19 is a pair of spaced parallel ears 22, between which is pivoted the trigger 23, the latter having an elongated reduced portion 24 to which is fixed the bait pan 25, that is disposed to overlie the arms 7 of the post when the trap is set for a catch. The opposite end of the trigger 23 is substantially beveled in a manner to provide an upper beveled portion and a lower beveled portion, and the upper beveled portion is relatively wider than the lower beveled portion. By providing the beveled end, it will be apparent that the extreme end is substantially sharp, and this sharp end is engageable with the upper end of the cam surface of the dog 20 when the trap is set to what is termed a hair trigger, or in other words the trigger and its pan is disposed to the position as shown in full lines in Figure 3, but when set in full position, the upper beveled surface is engageable with the cam surface of the dog 20, or as shown in the lower dotted line position of Figure 3. When it is desired to set the trap in safety position, the trigger is arranged whereby the dog will be received in a shoulder 26 formed by reducing the adjacent end of the trigger, and the safety position is illustrated in the upper dotted line position of Figure 3.

From the above description and disclosure of the drawing, it will be obvious that I have provided an animal trap that includes a swivel connection between its anchoring chain and the trap proper, with the result the trap is freely rotatable and therefore it is impossible for it to become fixed. This feature is extremely important in that when the trap of the clamping jaw anchored type becomes fixed, a perfect leverage is provided for the caught leg of the animal, whereby it is an easy matter for the animal to break its leg and escape, and it has been ascertained that approximately thirty per cent of the animals caught in traps that become fixed, escape.

The fact that the trap can be set to catch animals of a size desired is likewise extremely important, as when the trap is set in full position, as shown in full lines in Figure 3, birds and the like as well as under sized animals cannot trip the trigger. For an example, if the trap is of a size to catch muskrats or like animals, and it is set in full position, only the full sized muskrats and the like will be caught, as the young muskrats or kittens are not capable of tripping the trigger.

When the trap is set in safety position as shown in the upper dotted line position of the trigger, in Figure 3, it can be handled without fear of tripping, and this feature is extremely advantageous, as a multiplicity of traps can be set in the house or other warm place prior to taking them to the hunting grounds, where slight adjustment of the trigger can then be made without the trapper removing his mittens.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An animal trap comprising a body, anchoring means swivelly associated therewith, a post arranged in said body and extending through the top thereof, a disk carried by said post, a coil spring surrounding the post and mounted on the disk to urge the post inwardly of said body, cooperating jaws pivotally secured to said post, and tripping means carried by one of said jaws and engageable with the body to hold the jaws in set position.

2. An animal trap comprising a cylindrical body, a post arranged in said body and passing through the top thereof, an eye including a shank swivelly connected to the post and extending through the bottom of the body, anchoring means for said trap, a resilient link included in the anchoring means and connected to the eye whereby the body will rotate on said link, spring means connected to the post to urge the latter inwardly in said housing, a pair of cooperating jaws pivotally secured to the post, tripping means carried by one of said jaws and engageable with the body to hold the jaws in set position, a trigger included in the tripping means, and means whereby the trigger can be set in various adjusted positions.

3. An animal trap comprising a body, cooperating spring pressed jaws having pivotal connection with said body, a bracket secured to one of said jaws, a trigger pivotally secured to said bracket, a bait pan secured to one portion of the trigger, a dog pivotally secured to said bracket and being held in engagement with the body by the trigger, to hold the jaws in set position, and means whereby the trigger can be arranged in various set positions.

4. An animal trap comprising a body, a spring pressed post mounted in said body and rising therefrom, a pair of cooperating jaws carried by said post, a bracket secured to one of said jaws, a trigger pivotally secured to said bracket, a bait pan fixed to one end portion of the trigger, a dog pivotally secured to the bracket and arranged in the path of the opposite end of the trigger to be engaged thereby to dispose the dog in engagement with said body to hold the jaws in set position, said dog having a cam surface to receive the last mentioned end of the trigger, said last mentioned end being shaped to provide beveled portions and movable on the cam surface in a manner to hold the trigger in various adjusted positions, and a shoulder on the trigger to receive the dog to hold the trigger in safety position.

5. In an animal trap, a body, spring pressed jaws having pivotal connection with said body, a bracket secured to one of said jaws, a trigger pivotally secured to the bracket, and a dog pivoted to the bracket and engageable with the body to hold the jaws in set position, and said dog having a cam surface to receive one end of the trigger to hold the latter in various set positions.

ALLEN McMULLEN.